United States Patent
Isobe et al.

(10) Patent No.: US 10,912,342 B2
(45) Date of Patent: Feb. 9, 2021

(54) GLOVE AND PRODUCTION METHOD OF GLOVE

(71) Applicant: SHOWA GLOVE CO., Himeji (JP)

(72) Inventors: Shogo Isobe, Himeji (JP); Tatsuya Sakamoto, Himeji (JP)

(73) Assignee: Showa Glove Co., Hyogo (JP)

( * ) Notice: Subject to any disclaimer, the term of this patent is extended or adjusted under 35 U.S.C. 154(b) by 150 days.

(21) Appl. No.: 16/193,889

(22) Filed: Nov. 16, 2018

(65) Prior Publication Data

US 2019/0150537 A1    May 23, 2019

(30) Foreign Application Priority Data

Nov. 17, 2017  (JP) ................................. 2017-221686

(51) Int. Cl.

| | |
|---|---|
| *A41D 19/00* | (2006.01) |
| *B29C 41/14* | (2006.01) |
| *C08K 3/22* | (2006.01) |
| *C08K 5/29* | (2006.01) |
| *B29L 31/48* | (2006.01) |
| *B29K 7/00* | (2006.01) |
| *B29K 9/00* | (2006.01) |
| *B29K 509/00* | (2006.01) |

(52) U.S. Cl.
CPC .......... *A41D 19/0058* (2013.01); *B29C 41/14* (2013.01); *C08K 3/22* (2013.01); *C08K 5/29* (2013.01); *B29K 2007/00* (2013.01); *B29K 2009/00* (2013.01); *B29K 2509/00* (2013.01); *B29L 2031/4864* (2013.01); *C08K 2003/2296* (2013.01)

(58) Field of Classification Search
CPC .... C08K 3/22; C08K 5/29; C08K 2003/2296; A41D 19/0058; B29C 41/14; B29K 2007/00; B29K 2009/00; B29K 2509/00; B29L 2031/4864
See application file for complete search history.

(56) References Cited

U.S. PATENT DOCUMENTS

| | | | |
|---|---|---|---|
| 2005/0171272 A1 | 8/2005 | Ota et al. | |
| 2018/0186128 A1* | 7/2018 | Kato | .................. D06M 15/693 |
| 2019/0161601 A1* | 5/2019 | Enomoto | ................ C08L 15/00 |

FOREIGN PATENT DOCUMENTS

| | | | | |
|---|---|---|---|---|
| EP | 3459375 A1 | 10/2012 | | |
| EP | 3 459 375 A1 | 3/2019 | | |
| JP | 2003-336113 A | 11/2003 | | |
| JP | 2017-036459 | 2/2017 | | |
| WO | 97/48765 A1 | 12/1997 | | |
| WO | WO-2017014029 A1 * | 1/2017 | ......... | A41D 19/0096 |
| WO | 2017/104315 A1 | 6/2017 | | |
| WO | WO-2018117109 A1 * | 6/2018 | ............ | B29C 41/14 |

* cited by examiner

*Primary Examiner* — Angela C Scott
(74) *Attorney, Agent, or Firm* — Norris McLaughlin, P.A.

(57) ABSTRACT

A glove includes a glove main body for covering a wearer's hand, the glove main body containing nitrile-butadiene rubber as a principal component, wherein: the glove main body comprises zinc oxide, a vulcanizing agent, a vulcanization accelerating agent, and a cross-linked product from the nitrile-butadiene rubber and polycarbodiimide; a mass ratio of the polycarbodiimide to the nitrile-butadiene rubber is no less than 0.003 and no greater than 0.1; a mass ratio of the zinc oxide to the nitrile-butadiene rubber is no less than 0.010 and no greater than 0.05; and a MEK-absorption capacity of the glove main body is no greater than 25 times the glove main body on a mass basis. The percentage content of a MEK-insoluble matter in the glove main body is preferably no less than 65% by mass. The molar ratio of zinc oxide to the carbodiimide group in the polycarbodiimide is preferably 1 to 50.

4 Claims, 1 Drawing Sheet

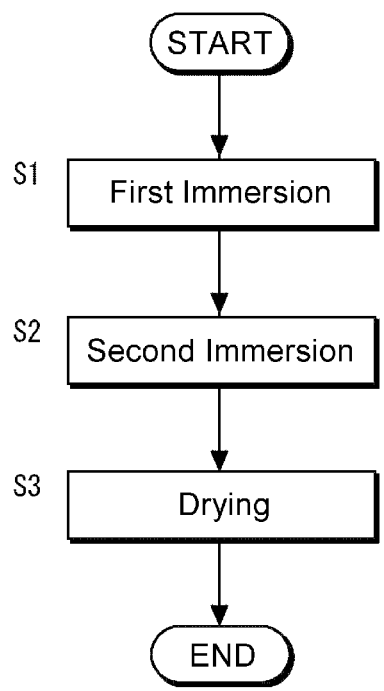

GLOVE AND PRODUCTION METHOD OF GLOVE

BACKGROUND OF THE INVENTION

Field of Invention

The present invention relates to a glove and a production method of a glove.

Description of the Related Art

A glove constituted with a latex coating film is produced through formation of the coating film, for example by the following procedure. First, a pottery or metallic hand glove mold is immersed in a coagulation agent and then in a latex material. Subsequently, a latex coating film formed on an external surface of the hand glove mold after the immersion is dried and removed from the hand glove mold, to thereby obtain a glove.

In light of oil resistance and chemical resistance, a material containing nitrile-butadiene rubber is used as the latex material. However, in the case of using the material containing nitrile-butadiene rubber, during the drying of the material for formation of the latex coating film, the coating film is likely to contract, leading to generation of cracks in a glove to be produced. Such cracks may therefrom lead to formation of a cleavage. Particularly in a case of a glove in which a latex coating film has irregularities on its surface for imparting an antislipping effect or a visual effect, it is difficult to balance tension applied on the coating film during drying and an influence of the cracks is remarkable. Consequently, the cracks generated during manufacture may result in reduced durability of the glove, as well as reduced oil resistance and chemical resistance of the glove due to penetration through the cleavage. In addition, the cracks may result in insufficient tearing strength of the glove.

For example, in order to inhibit the cracks, a method has been proposed involving adding sulfur or a vulcanization accelerating agent to the latex material (see for example, Japanese Unexamined Patent Application, Publication No. 2003-336113). Adding sulfur or the vulcanization accelerating agent promotes vulcanization, whereby a certain crack inhibition effect is obtained. However, adding sulfur or the vulcanization accelerating agent causes destabilization and increased viscosity of the latex material, leading to reduced handleability. Therefore, an amount of sulfur or the vulcanization accelerating agent added is limited. Further inhibition of generation of cracks and a further improvement of tearing strength are therefore desired.

PRIOR ART DOCUMENTS

Patent Documents

Patent Document 1: Japanese Unexamined Patent Application Publication No. 2003-336113

SUMMARY OF THE INVENTION

Problems to be Solved by the Invention

The present invention has been made in view of the aforementioned situation, and an object of the invention is to provide a glove and a production method of the glove, a glove main body of the glove being constituted with nitrile butadiene rubber as a principal component and being accompanied by less generation of cracks, with high tearing strength of the glove.

Means for Solving the Problems

The present inventors have found that generation of cracks is dramatically inhibited in a latex coating film formed from a nitrile-butadiene latex material with polycarbodiimide and zinc oxide concurrently blended. Although not necessarily clarified, the mechanism of the reduction of the cracks is presumed to be as in the following. Since the positions of a polar group in nitrile-butadiene rubber and a carbodiimide group in the polycarbodiimide are fixed and proximate to each other due to polarity of the zinc oxide, the polar group and the carbodiimide group in the polycarbodiimide are more likely to react with each other, resulting in promotion of crosslinking. In other words, it is presumed that the contraction of the latex coating film during formation of the coating film would fail to result in the generation of cracks due to such an effect of promoting the crosslinking.

Furthermore, the present inventors have found that adjusting amounts of the polycarbodiimide and the zinc oxide blended, upon blending of the polycarbodiimide and the zinc oxide, such that a methyl ethyl ketone-absorption capacity of the latex coating film after a heat treatment, i.e., the glove main body, is no greater than 25 times, enables generation of cracks in the glove main body to be inhibited and the tearing strength of the glove to be increased. Accordingly, the present invention was accomplished.

According to an aspect of the invention made for solving the aforementioned problems, a glove includes a glove main body for covering a wearer's hand, the glove main body containing nitrile-butadiene rubber as a principal component, wherein: the glove main body comprises zinc oxide, a vulcanizing agent, a vulcanization accelerating agent, and a cross-linked product from the nitrile-butadiene rubber and polycarbodiimide; a mass ratio of the polycarbodiimide to the nitrile-butadiene rubber is no less than 0.003 and no greater than 0.1; a mass ratio of the zinc oxide to the nitrile-butadiene rubber is no less than 0.010 and no greater than 0.05; and a methyl ethyl ketone-absorption capacity of the glove main body is no greater than 25 times the glove main body on a mass basis.

In regard to the glove, the glove main body contains the polycarbodiimide and zinc oxide, of which mass ratios to the nitrile-butadiene rubber are no less than the aforementioned lower limits. In addition, in the glove, a high crosslinking density between the nitrile-butadiene rubber and the polycarbodiimide enables the generation of cracks in the glove main body to be inhibited and the tearing strength to be increased, when the methyl ethyl ketone-absorption capacity of the glove main body is no greater than the aforementioned upper limit. Furthermore, the glove is superior in flexibility when the mass ratio of the polycarbodiimide to the nitrile-butadiene rubber is no greater than the aforementioned upper limit, and inhibition of deterioration of the glove main body caused by excessive zinc oxide is enabled when the mass ratio of zinc oxide to the nitrile-butadiene rubber is no greater than the aforementioned upper limit. Therefore, the glove is superior in appearance, flexibility and tearing strength, and provides superior durability, oil resistance, and chemical resistance due to less likelihood of formation of a cleavage in the glove main body.

The percentage content of a methyl ethyl ketone-insoluble matter in the glove main body is preferably no less than 65% by mass. The further inhibition of the generation of cracks in the glove main body is enabled when the percentage content of a methyl ethyl ketone-insoluble matter in the glove main body is no less than the aforementioned lower limit since the nitrile-butadiene rubber and the polycarbodiimide having been crosslinked increases.

The molar ratio of zinc oxide to the carbodiimide group in the polycarbodiimide is preferably no less than 1 and no greater than 50. The further inhibition of the generation of cracks in the glove main body is enabled when the molar ratio of zinc oxide to the carbodiimide group in the polycarbodiimide falls within the aforementioned range.

According to another aspect of the invention made for solving the aforementioned problems, a production method of a glove including a glove main body for covering a wearer's hand, the glove main body containing nitrile-butadiene rubber as a principal component, includes immersing in a coagulation agent solution a hand glove mold, immersing in a latex material the hand glove mold after the immersing in the coagulation agent solution, and subjecting the hand glove mold to drying after the immersing in the latex material, in which: the latex material comprises a nitrile-butadiene rubber latex, polycarbodiimide, zinc oxide, a vulcanizing agent, and a vulcanization accelerating agent; contents of the polycarbodiimide and zinc oxide in the latex material are adjusted in such a way that, in the glove main body, a mass ratio of the polycarbodiimide to the nitrile-butadiene rubber is no less than 0.003 and no greater than 0.1, and a mass ratio of zinc oxide to the nitrile-butadiene rubber is no less than 0.010 and no greater than 0.05; and in the drying, a profile of drying temperature and drying time period is controlled in such a way that a methyl ethyl ketone-absorption capacity of the glove main body is no greater than 25 times the glove main body on a mass basis.

In the production method of a glove, the latex material containing the polycarbodiimide and zinc oxide, of which mass ratios to the nitrile-butadiene rubber are no less than the aforementioned lower limits, is used, and in the drying, a profile of drying temperature and drying time period is controlled in such a way that a methyl ethyl ketone-absorption capacity of the glove main body is no greater than 25 times the glove main body on a mass basis. Therefore, in the glove produced by the production method, a high crosslinking density between the nitrile-butadiene rubber and the polycarbodiimide enables the generation of cracks in the glove main body to be inhibited and the tearing strength to be increased. Furthermore, the glove produced by the production method is superior in flexibility when the mass ratio of the polycarbodiimide to the nitrile-butadiene rubber in the latex material is no greater than the aforementioned upper limit, and inhibition of deterioration of the glove main body caused by excessive zinc oxide is enabled when the mass ratio of zinc oxide to the nitrile-butadiene rubber is no greater than the aforementioned upper limit. Therefore, the glove produced by the production method of the above embodiments is superior in appearance, flexibility and tearing strength, and provides superior durability, oil resistance, and chemical resistance due to less likelihood of formation of a cleavage in the glove main body.

The profile preferably includes drying conditions involving the drying temperature of no lower than 100° C. and no higher than 150° C. and the drying time period of no less than 10 min and no greater than 90 min. When the profile includes such drying conditions, the crosslinking between the nitrile-butadiene rubber and the polycarbodiimide is facilitated, consequently enabling the further inhibition of the generation of cracks in the glove main body.

The term "principal component" as referred to herein means a component which is of the highest content, for example a component of which content is no less than 50% by mass.

The terms "methyl ethyl ketone-absorption capacity" and "percentage content of a methyl ethyl ketone-insoluble matter" are values obtained according to the following procedure. First, a circular film having a diameter of about 10 cm in a planar view is provided. The film may be provided either by cutting out from the glove main body or by producing a film having a constitution identical to that of the glove main body. Although the present inventors have obtained a knowledge that the methyl ethyl ketone-absorption capacity and the percentage content of a methyl ethyl ketone-insoluble matter do not depend greatly on a thickness of the film, the average thickness of the film to be provided is preferably no less than 0.02 mm and no greater than 1.0 mm. The film is washed with 1 liter of water at normal temperature for 15 min, and then, after wipe-off of the water, dried in an oven at 30° C. for 1 hour. Next, the film is cut into small test pieces of about 5 mm-square, a plurality of test pieces are selected to have a total mass of about 0.2 g, and the total mass (W (g)) is measured to 4 significant digits. The plurality of test pieces are placed in a #80-mesh metal basket having a mass measured beforehand (bottom face: about 2-cm square, weight: 7 to 11 g). Subsequently, the basket containing the plurality of test pieces is immersed in 100 ml of methyl ethyl ketone (MEK) and left to stand for 24 hrs at a temperature no lower than 23° C. and no higher than 25° C. The basket is thereafter withdrawn from MEK and gently shaken for 30 sec to drain excessive MEK, and then a total mass of the basket containing the plurality of test pieces is measured. A mass (A (g)) of the plurality of test pieces impregnated with MEK is obtained by calculating a difference between the total mass of the basket containing the plurality of test pieces and the mass of the basket measured beforehand. Furthermore, the basket containing the plurality of test pieces is subjected to drying at 30° C. for 3 hr and then at 105° C. for 30 min, and thereafter a total mass of the basket containing the plurality of test pieces is measured. A mass (B (g)) of the plurality of test pieces after the drying is obtained by calculating a difference between the total mass of the basket containing the plurality of test pieces and the mass of the basket measured beforehand. On the basis of the masses thus calculated, the methyl ethyl ketone-absorption capacity of, and the percentage content of a methyl ethyl ketone-insoluble matter in, the test pieces are obtained according to the following equations.

$$\text{Methyl ethyl ketone-absorption capacity (times)}=A/B \qquad (1)$$

$$\text{Percentage content of a methyl ethyl ketone-insoluble matter (\% by mass)}=B/W\times 100 \qquad (2)$$

Effects of the Invention

As explained in the foregoing, in regard to the glove according to the present invention and the glove produced by the production method according to the present invention, the glove main body containing nitrile butadiene rubber as a principal component has only a small number of cracks and high tearing strength. Therefore, the glove according to the present invention is superior in appearance, and provides superior durability, oil resistance, and chemical resistance due to less likelihood of formation of a cleavage in the glove main body.

BRIEF DESCRIPTION OF THE DRAWINGS

FIG. 1 is a flow diagram showing a production method of a glove according to an embodiment of the present invention.

DESCRIPTION OF THE PREFERRED EMBODIMENTS

Embodiments of the present invention will be described in detail hereafter.

Glove

A glove according to an embodiment of the present invention is provided with a glove main body for covering a wearer's hand.

Glove Main Body

The glove main body includes: a main body portion formed in a pouch-like shape to cover a main body of a wearer's hand; an extending portion extending from the main body portion to cover the wearer's fingers; and a cylindrical cuff portion extending from the main body portion in an opposite direction from the extending portion to cover the wearer's wrist. The extending portion includes a first finger portion, a second finger portion, a third finger portion, a fourth finger portion, and a fifth finger portion that cover the wearer's first finger (thumb), second finger (index finger), third finger (middle finger), fourth finger (ring finger), and fifth finger (pinky finger) respectively. The first to fifth finger portions are each formed in a cylindrical shape with a closed fingertip portion. In addition, the cuff portion has an opening through which the wearer's hand can be inserted.

The glove main body is constituted with a latex coating film containing nitrile butadiene rubber as a principal component. The glove main body further contains zinc oxide and a cross-linked product from the nitrile-butadiene rubber and polycarbodiimide. The glove main body also contains the vulcanizing agent and the vulcanization accelerating agent as additives.

Nitrile-Butadiene Rubber

The nitrile-butadiene rubber is formed by copolymerizing acrylonitrile and butadiene as monomers.

The lower limit of the amount of the acrylonitrile compounded is preferably 20 parts by mass and more preferably 25 parts by mass with respect to 100 parts by mass of the nitrile-butadiene rubber. Meanwhile, the upper limit of the amount of the acrylonitrile compounded is preferably 40 parts by mass, more preferably 35 parts by mass, and still more preferably 30 parts by mass. When the amount of the acrylonitrile compounded is less than the lower limit, oil resistance and durability of the glove may be inferior. To the contrary, when the amount of the acrylonitrile compounded is greater than the upper limit, flexibility of the glove may be inferior.

The lower limit of the amount of the butadiene compounded is preferably 55 parts by mass, more preferably 57 parts by mass, and still more preferably 62 parts by mass with respect to 100 parts by mass of the nitrile-butadiene rubber. Meanwhile, the upper limit of the amount of the butadiene compounded is preferably 78 parts by mass, more preferably 72 parts by mass, and still more preferably 70 parts by mass. When the amount of the butadiene compounded is less than the lower limit, flexibility of the glove may be inferior. To the contrary, when the amount of the butadiene compounded is greater than the upper limit, oil resistance and durability of the glove may be inferior.

The nitrile-butadiene rubber may involve a well-known monomer in the copolymerization, within a range not leading to impairment of strength and flexibility of the glove. The well-known monomer is exemplified by a monomer having a polar group such as a carboxyl group, a sulfonic acid group, an acid anhydride group, and an amide group. Examples of the monomer having a carboxyl group include: ethylenic unsaturated monocarboxylic acid monomers such as acrylic acid, methacrylic acid, crotonic acid and cinnamic acid; and the like. Examples of the monomer having a sulfonic acid group include: ethylenic unsaturated acid monomers such as styrene sulfonic acid; and the like. Examples of the monomer having an acid anhydride group include: ethylenic unsaturated acid monomers such as maleic anhydride and citraconic anhydride; and the like. Examples of the monomer having an amide group include: ethylenic unsaturated carboxylic acid amide monomers such as (meth)acrylamide, N,N-dimethylacrylamide and N-methylolacrylamide; and the like. After the copolymerization, these polar groups serve to improve stability of the latex material, which is a material for the glove main body. Specifically, in the latex material, some of these are each paired with a monovalent cation such as a potassium ion, a sodium ion and an ammonium ion, to stabilize nitrile-butadiene rubber latex particles in an aqueous solvent. Furthermore, some or all of the aforementioned polar groups (including ionized products) each react with the polycarbodiimide and zinc oxide during production of the glove main body, to form a covalent bond with the carbodiimide group and a metallic bond with a zinc ion. This enables promotion of the crosslinking during production of the glove main body. Of the foregoing monomers, methacrylic acid and acrylic acid are preferably employed in light of stability and physical property.

The lower limit of the amount of the methacrylic acid or the acrylic acid compounded is preferably 2 parts by mass and more preferably 3 parts by mass with respect to 100 parts by mass of the nitrile-butadiene rubber. Meanwhile, the upper limit of the amount of the methacrylic acid or the acrylic acid compounded is preferably 10 parts by mass and more preferably 8 parts by mass. When the amount of the methacrylic acid or the acrylic acid compounded is less than the lower limit, an effect of improving stability of the latex material may be insufficient, and an effect of promoting crosslinking in the glove main body may be insufficient. To the contrary, when the amount of the methacrylic acid or the acrylic acid compounded is greater than the upper limit, the glove main body may be likely to contract during drying to generate cracks, and flexibility of the glove may be inferior.

In the case in which the glove main body contains the vulcanizing agent and the vulcanization accelerating agent as additives, film formability, strength and solvent resistance of the glove main body are improved. When the glove is transported, stored, etc. in a folded state, the glove main body may deteriorate in a bent portion thereof, leading to a reduction in durability. The durability is dramatically improved when the vulcanizing agent and the vulcanization accelerating agent are contained as additives. Furthermore, to the nitrile-butadiene rubber, an additive typically blended into nitrile-butadiene rubber, for example an emulsifying agent, a pH adjusting agent, a crosslinking agent, a thickening agent, a heat-sensitive agent, an antioxidant, a surfactant, a plasticizer, and the like may be added. It is to be noted that, when the vulcanizing agent or the vulcanization accelerating agent is contained, chemical allergy may be caused and odor may be transferred from the glove during food processing operations etc.

The vulcanizing agent is exemplified by powder sulfur, flowers of sulfur, precipitated sulfur, colloidal sulfur, surface-treated sulfur, insoluble sulfur, and the like. These vulcanization agents may be used alone or in combination of two or more types. Of these, colloidal sulfur is preferred.

The amount of the vulcanizing agent blended with respect to 100 parts by mass of the nitrile butadiene rubber is preferably no less than 0.1 parts by mass and no greater than 3.0 parts by mass. When the amount of the vulcanizing agent blended is less than the lower limit, an effect of improving strength may be insufficient. To the contrary, when the amount of the vulcanizing agent blended is greater than the upper limit, the glove may be stiff in texture.

Examples of the vulcanization accelerating agent include: dithiocarbamic acid-based vulcanization accelerating agents such as zinc dimethyldithiocarbamate, zinc diethyldithiocarbamate, and zinc dibutyldithiocarbamate; thiazole-based vulcanization accelerating agents such as zinc-2-mercaptobenzothiazole; thiram-based vulcanization accelerating agents; thiourea-based vulcanization accelerating agents; guanidine-based vulcanization accelerating agents; and the like. These vulcanization accelerating agents may be used alone or in combination of two or more types. Of these, the dithiocarbamic acid-based vulcanization accelerating agents are preferred.

The amount of the vulcanization accelerating agent blended with respect to 100 parts by mass of the nitrile butadiene rubber is preferably no less than 0.5 parts by mass and no greater than 5.0 parts by mass. When the amount of the vulcanization accelerating agent blended is less than the lower limit, an effect of accelerating vulcanization may be insufficient. To the contrary, when the amount of the vulcanization accelerating agent blended is greater than the upper limit, the glove may be firm in texture, and initial vulcanization is accelerated to cause scorching.

Polycarbodiimide

Polycarbodiimide is a compound having a plurality of carbodiimide groups in a single molecule. The polycarbodiimide is exemplified by a polymer synthesized through a condensation reaction of an organic diisocyanate compound accompanied by decarboxylation. Examples of the organic diisocyanate compound include an aromatic diisocyanate compound, an aliphatic diisocyanate compound, an alicyclic diisocyanate compound, and a mixture thereof. Specific examples of the organic diisocyanate compound include toluene-2,4-diisocyanate, toluene-2,6-diisocyanate, a mixture of toluene-2,4-diisocyanate and toluene-2,6-diisocyanate, diphenylmethane-4,4-diisocyanate, 1,4-phenylenediisocyanate, dicyclohexyl-methane-4,4'-diisocyanate, 3-isocyanatomethyl-3,5,5-trimethylcyclohexyl isocyanate, 1,6-hexyldiisocyanate, 1,4-cyclohexyldiisocymate, norbornyl diisocyanate, and the like. Of these, dicyclohexyl-methane-4,4'-diisocyanate and 3-isocyanatomethyl-3,5,5-trimethylcyclohexyl isocyanate are preferred.

Specific examples of the polycarbodiimide include V-02 (590), V-02-L2 (385), SV-02 (430), V-04 (335), V-10 (410), SW-12G (465), E-02 (445), E-03A (365) and E-05 (310) available from Nisshinbo Chemical Inc., and the like. It is to be noted that the numerical values in parentheses each indicate carbodiimide equivalent. Alternatively, XR-5508, XR-5577, XR-5580 and XR-13-554 available from Stahl Japan Limited, and the like may also be used. Of these, E-02, E-03A, E-05, and XR-5508 are preferred from the perspective that these are aqueous solvent-based and provide superior pot life performance of blended materials.

A carbodiimide group reacts with the polar group in the nitrile-butadiene rubber to form a cross-linked product. As a result, during formation of the glove main body, film formability after drying is improved and consequently inhibition of generation of cracks is enabled. In addition, as described later, since the glove main body is formed by immersing a hand glove mold in the latex material containing the nitrile-butadiene rubber, the polycarbodiimide and zinc oxide, it is presumed that the crosslinking reaction takes place even in the undried coating film immediately after the immersion and the withdrawal of the hand glove mold in and from the latex material, to consequently enhance an effect of improving film formability provided by zinc oxide.

The lower limit of the carbodiimide equivalent of the polycarbodiimide is preferably 200 and more preferably 250. Meanwhile, the upper limit of the carbodiimide equivalent of the polycarbodiimide is preferably 1,000 and more preferably 650. When the carbodiimide equivalent of the polycarbodiimide is less than the lower limit, flexibility of the glove may be inferior. To the contrary, when the carbodiimide equivalent of the polycarbodiimide is greater than the upper limit, the effect of promoting crosslinking provided by the carbodiimide group may be insufficient. The term "carbodiimide equivalent" as referred to means a mass (g) of a carbodiimide compound necessary for provide 1 mol of carbodiimide group, i.e., a numerical value obtained by dividing a molecular weight of the carbodiimide compound by the number of carbodiimide groups contained in the carbodiimide compound.

The lower limit of the mass ratio of the polycarbodiimide to the nitrile butadiene rubber is preferably 0.003, and more preferably 0.005. Meanwhile, the upper limit of the mass ratio of the polycarbodiimide is preferably 0.1, and more preferably 0.06. When the mass ratio of the polycarbodiimide is less than the lower limit, the effect of inhibiting generation of cracks in the glove main body may be insufficient and tensile strength of the glove main body may be inferior. To the contrary, when the mass ratio of the polycarbodiimide is greater than the upper limit, the flexibility of the glove may be inferior.

The cross-linked product from the nitrile-butadiene rubber and the polycarbodiimide preferably includes: a carboxyl group; a carbodiimide group; and a reaction-produced group from a carboxyl group and a carbodiimide group. Positions of the carboxyl group and the carbodiimide group are likely to be fixed and proximate to each other due to zinc oxide. Accordingly, production of the reaction-produced group from the carboxyl group and the carbodiimide group is facilitated and crosslinking is likely to be promoted during production of the glove. Further inhibition of the generation of cracks is thus enabled.

In the case in which the cross-linked product from the nitrile butadiene rubber and the polycarbodiimide comprises the carboxyl group; the carbodiimide group; and the reaction-produced group from the carboxyl group and the carbodiimide group, the lower limit of a molar ratio of a total of the carbodiimide group and the reaction-produced group to a total of the carboxyl group and the reaction-produced group is preferably 0.008, more preferably 0.01, still more preferably 0.015, and particularly preferably 0.02. Meanwhile, the upper limit of the molar ratio is preferably 1, more preferably 0.5, and still more preferably 0.3. When the mass ratio is less than the lower limit, the effect of inhibiting generation of cracks in the glove main body may be insufficient and tensile strength of the glove main body may be inferior. To the contrary, when the molar ratio is greater than the upper limit, flexibility of the glove may be inferior.

Zinc Oxide

Zinc oxide interacts with the polar group in the nitrile-butadiene rubber to improve film formability of the glove main body after the immersion in the latex material. However, the effect of improving film formability provided by zinc oxide alone is relatively small, and consequently, during the drying after the immersion for formation of the glove main body, the glove main body may not resist tension applied by contraction thereof due to a decrease in volume during vaporization of moisture, and may generate cracks in the glove main body. In this respect, the glove of the present invention enables enhancement of the effect of improving film formation due to the polycarbodiimide and zinc oxide contained in the coating layer, and thus cracks are less likely to be generated in the glove main body.

The lower limit of the mass ratio of zinc oxide to the nitrile butadiene rubber is 0.010. Meanwhile, the upper limit of the mass ratio of zinc oxide is preferably 0.05, more preferably 0.04, and still more preferably 0.035. When the molar ratio of zinc oxide is less than the lower limit, the tearing strength of the glove is insufficient. To the contrary, when the mass ratio of zinc oxide is greater than the upper limit, the flexibility of the glove may be inferior; and the excessive amount of zinc oxide may result in reduced tearing strength of the glove and instability of the latex material.

In the case in which the nitrile butadiene rubber includes the carboxyl group, the lower limit of the molar ratio of zinc oxide to the carboxyl group is preferably 0.1, and more preferably 0.2. Meanwhile, the upper limit of the molar ratio of zinc oxide to the carboxyl group is not particularly limited, but preferably 1, and more preferably 0.5. When the molar ratio of zinc oxide is less than the lower limit, the effect of inhibiting generation of cracks in the glove main body may be insufficient. To the contrary, when the molar ratio of zinc oxide is greater than the upper limit, the excessive amount of zinc oxide may lead to deterioration of the glove main body.

In regard to the glove of the present embodiment, the glove main body contains zinc oxide and a cross-linked product from the nitrile-butadiene rubber and polycarbodiimide. Although not necessarily clarified, the mechanism of the inhibition of the cracks in the glove main body by the carbodiimide group is presumed to be as in the following. The carbodiimide group is proximate to zinc oxide and a position thereof is likely to be fixed. Furthermore, a polar group in the nitrile-butadiene rubber is likely to be proximate to zinc oxide. Accordingly, the carbodiimide group and the polar group in the nitrile-butadiene rubber are likely to be proximate to each other via zinc oxide, whereby a covalent bond can be formed between the carbodiimide group and the polar group in the nitrile-butadiene rubber. The effect of inhibiting generation of cracks in the glove main body, the effect of increasing tearing strength, and the effect of increasing chemical resistance are believed to be thus produced. Therefore, in order to produce the aforementioned effects, the specific amount of zinc oxide is required that serves like a catalyst in formation of the covalent bond between the carbodiimide group and the polar group in the nitrile-butadiene rubber.

The lower limit of the molar ratio of zinc oxide to the carbodiimide group is preferably 1 and more preferably 5. Meanwhile, the upper limit of the molar ratio of zinc oxide to the carbodiimide group is preferably 50, more preferably 40, and still more preferably 35. When the molar ratio of the zinc oxide to the carbodiimide group is less than the lower limit, the amount of zinc oxide is small relative to the amount of the carbodiimide group. The smaller amount of the zinc oxide may result in the insufficient effect of inhibiting the generation of cracks in the glove main body, while the greater amount of the carbodiimide group may result in the reduced flexibility of the glove. To the contrary, when the molar ratio of zinc oxide to the carbodiimide group is greater than the upper limit, the amount of the carbodiimide group is small relative to the amount of the zinc oxide. The smaller amount of the carbodiimide group may result in the insufficient effect of inhibiting the generation of cracks in the glove main body while the greater amount of the zinc oxide may result in the reduced tearing strength of the glove and the instability of the latex material.

Furthermore, the present inventors have found that adjusting amounts of the polycarbodiimide and zinc oxide blended, upon blending of the polycarbodiimide and zinc oxide, such that the percentage content of a methyl ethyl ketone-insoluble matter and the methyl ethyl ketone-absorption capacity of the glove main body fall within the specific ranges, enables generation of cracks in the glove main body to be inhibited and the tearing strength of the glove to be increased.

The percentage content of a methyl ethyl ketone (MEK)-insoluble matter in the glove main body is a proportion (% by mass) of a matter that is insoluble in MEK in the latex coating film constituting the glove main body. The percentage content of the MEK-insoluble matter is regarded as a value indicating a degree of completion of crosslinking in the latex coating film. The present inventors have confirmed that a greater percentage content of the MEK-insoluble matter indicates a higher degree of completion of crosslinking, enabling inhibition of generation of cracks in the glove main body and improvement of solvent resistance. For example, the present inventors have obtained a knowledge that crosslinking may proceed with typical vulcanizing agents of the nitrile-butadiene rubber, such as sulfur, a vulcanization accelerating agent, zinc oxide, etc.; however, when the percentage content of the MEK-insoluble matter is small, chemical resistance of the glove main body may be insufficient. Accordingly, even in the case in which the polycarbodiimide and zinc oxide are blended, it is preferred to adjust the amounts of the polycarbodiimide and zinc oxide blended such that the percentage content of the MEK-insoluble matter is no less than the specific value.

The lower limit of the percentage content of the MEK-insoluble matter of the glove main body is preferably 65% by mass, more preferably 70% by mass, and still more preferably 80% by mass. When the percentage content of the MEK-insoluble matter is less than the lower limit, sufficient chemical resistance may not be obtained. Meanwhile, the upper limit of the percentage content of the MEK-insoluble matter is not particularly limited; however, the percentage content of the MEK-insoluble matter is typically no greater than 95% by mass.

When the latex coating film constituting the glove main body is immersed in MEK, a part of the coating film is dissolved, whereas the remainder is swelled with MEK but remains undissolved. The MEK-absorption capacity of the glove main body is a value (times) obtained by dividing a mass of the remainder swelled with MEK by a mass of the dried remainder, of the latex coating film constituting the glove main body. The MEK-absorption capacity is regarded as a value indicating a crosslinking density in the latex coating film. The present inventors have confirmed that a smaller value of the MEK-absorption capacity indicates formation of a stronger bond with a high crosslinking density, enabling inhibition of generation of cracks in the glove main body and improvement of solvent resistance. The percentage content of a MEK-insoluble matter is believed to serve as an index of formation of cross-linked structures between molecules, whereas the MEK-absorption capacity is believed to serve as an index of the amount of cross-linked structures formed in the entire coating film. The present inventors have obtained a knowledge that inhibition of generation of cracks is particularly highly correlated with the MEK-absorption capacity indicating the amount of cross-linked structures formed in the entire coating film. Accordingly, in the case in which the polycarbodiimide and zinc oxide are blended, the amounts of the polycarbodiimide and zinc oxide blended are adjusted such that the MEK-absorption capacity is no greater than the specific value.

The upper limit of the MEK-absorption capacity of the glove main body is preferably 25 times, more preferably 20 times, and still more preferably 16 times. When the MEK-absorption capacity is greater than the upper limit, sufficient chemical resistance may not be obtained. Meanwhile, the lower limit of the MEK-absorption capacity is not particularly limited, and is typically no less than 3 times in light of flexibility of the glove.

Production Method of Glove

A production method a glove according to another embodiment of the present invention principally includes first immersion S1, second immersion S2 and drying S3, as shown in FIG. 1. The production method enables production of the glove including the glove main body that is for covering a wearer's hand and contains nitrile-butadiene rubber as a principal component.

First Immersion

In the first immersion S1, a hand glove mold is immersed in and withdrawn from a coagulation agent solution, and then a solvent in the coagulation agent solution is vaporized.

As the coagulation agent solution, a well-known solution may be used such as a methanol solution or an aqueous solution containing a polyvalent metal salt and/or an organic acid. In particular, the polyvalent metal salt is preferably contained. Due to the polyvalent metal salt being contained in the coagulation agent solution, control of an amount and a thickness of the latex material attached to the hand glove mold is facilitated.

The polyvalent metal salt is exemplified by barium chloride, calcium chloride, magnesium chloride, zinc chloride, aluminum chloride, barium nitrate, calcium nitrate, zinc nitrate, barium acetate, calcium acetate, zinc acetate, calcium sulfate, magnesium sulfate, aluminum sulfate, and the like. These polyvalent metal salts may be used alone or in combination of two or more types.

The lower limit of the content of the polyvalent metal salt in the coagulation agent solution is preferably 8% by mass and more preferably 15% by mass. Meanwhile, the upper limit of the content of the polyvalent metal salt is preferably 60% by mass and more preferably 40% by mass. When the content of the polyvalent metal salt is less than the lower limit, coagulation properties may be insufficient, leading to an insufficient thickness of the latex material attached to the hand glove mold and to an uneven thickness of the latex coating film due to running of the latex material. To the contrary, when the content of the polyvalent metal salt is greater than the upper limit, rapid coagulation of the latex material by the coagulation agent may result in formation of an uneven latex coating film.

The organic acid is exemplified by acetic acid, citric acid, and the like. The content of the organic acid in the coagulation agent solution is preferably no less than 5% by mass and no greater than 35% by mass. The organic acid may be used alone, but is preferably used in a mixture with the polyvalent metal salt. By using the organic acid in a mixture with the polyvalent metal salt, inhibition of thinning of the glove main body is enabled. In addition, the film-forming performance of the coagulation agent solution can be controlled more easily than in the case of using each of the organic acid and the polyvalent metal salt individually.

The temperature of the hand glove mold upon immersing the hand glove mold in the coagulation agent solution is preferably no lower than 40° C. and no higher than 80° C. When the temperature of the hand glove mold is lower than the lower limit, vaporization of the solvent from the hand glove mold may be insufficient. To the contrary, when the temperature of the hand glove mold is higher than the upper limit, evenness of a coagulation agent layer formed on the surface of the hand glove mold may be insufficient. It is to be noted that a time period of the immersion in the coagulation agent solution is not particularly limited.

The temperature for the volatilization of the solvent after the immersion in and withdrawal from the coagulation agent solution is preferably no less than 25° C. and no greater than 80° C. The time period of the volatilization of the solvent is preferably no less than 10 sec and no greater than 600 sec. When the temperature and time period of the volatilization of the solvent fall within the above ranges, controllability of volatilization of the solvent is enabled to be improved while production efficiency is maintained.

Second Immersion

In the second immersion S2, the hand glove mold with the coagulation agent layer formed after the first immersion S1 is immersed in and withdrawn from the latex material.

The latex material is obtained by blending the polycarbodiimide and zinc oxide with the nitrile-butadiene rubber latex. The amounts of the polycarbodiimide and zinc oxide blended are adjusted such that, after the formation of the glove main body, the contents of zinc oxide and the cross-linked product from the nitrile butadiene rubber and the polycarbodiimide are as desired. In addition, the vulcanizing agent and the vulcanization accelerating agent are added as additives, and other additives such as a surfactant may be added as needed.

A time period of the immersion of the hand glove mold in the latex material is not particularly limited and is, for example, no less than 10 sec and no greater than 200 sec.

It is preferred that an amount of the latex material to be attached to the surface of the hand glove mold is adjusted such that the average thickness of the glove main body to be formed is no less than 0.02 mm and no greater than 1.0 mm. It is to be noted that, in light of formability, the average thickness of the latex coating film formed by conducting the immersion once is no less than 0.05 mm and no greater than 0.5 mm. In other words, in a case of forming a thick latex coating film, it is preferred that the glove main body is formed through conducting the immersion in the latex material multiple times. In the case of conducting the immersion multiple times, the moisture in the latex coating film is vaporized between the immersion procedures, as appropriate. The vaporization of the moisture may be carried out under conditions similar to those for vaporization of moisture in the drying S3 (described below).

The present inventors have found that, in the case of using the latex material containing polycarbodiimide and zinc oxide, crosslinking proceeds in the withdrawn coating film obtained after the second immersion S2 even before heating in the drying (described below). Furthermore, the present inventors have confirmed that the progress of crosslinking in the unheated state has an influence on formability of the glove main body. It is also proven that the MEK-absorption capacity and the percentage content of the MEK-insoluble matter are available as parameters for confirming the progress of crosslinking. It is to be noted that since the withdrawn coating film obtained after the second immersion S2 is wet, it is preferred that the MEK-absorption capacity and the percentage content of the MEK-insoluble matter are measured after drying the withdrawn coating film in an oven at 30° C. for no less than 15 hrs, in light of measurement accuracy.

The percentage content of the MEK-insoluble matter in the withdrawn coating film obtained after the second immersion S2 (hereinafter, may be also merely referred to as "unheated coating film") is preferably greater than the percentage content of the MEK-insoluble matter in a coating film formed by immersing in and withdrawing from a latex material without the polycarbodiimide and zinc oxide, i.e., containing only nitrile-butadiene rubber latex (hereinafter, may be also merely referred to as "coating film not containing polycarbodiimide and zinc oxide"). The lower limit of a difference between the percentage content of the MEK-insoluble matter in the unheated coating film and the percentage content of the MEK-insoluble matter in the coating film not containing polycarbodiimide and zinc oxide is preferably 3% by mass, more preferably 5% by mass, and still more preferably 10% by mass. When the difference in the percentage content of the MEK-insoluble matter is less than the lower limit, the formability of the glove main body may be poor and the tearing strength of the glove may be insufficient. Meanwhile, the upper limit of the difference in the percentage content of the MEK-insoluble matter is not particularly limited and is preferably as great as possible.

The percentage content of the MEK-insoluble matter in the unheated coating film is influenced by the type, etc. of the nitrile-butadiene rubber which is the principal component of the latex material; however, the lower limit of the percentage content of the MEK-insoluble matter in the unheated coating film is preferably 30% by mass and more preferably 63% by mass. When the percentage content of the MEK-insoluble matter in the unheated coating film is less than the lower limit, the formability of the glove main body may be poor and the tearing strength of the glove may be insufficient. Meanwhile, the upper limit of the percentage content of the MEK-insoluble matter in the unheated coating film is not particularly limited; however, in light of film formability of the latex coating film, the percentage content of the MEK-insoluble matter is typically no greater than 95% by mass.

In addition, the MEK-absorption capacity of the unheated coating film is preferably smaller than the MEK-absorption capacity of the coating film not containing polycarbodiimide and zinc oxide. The lower limit of a difference between the MEK-absorption capacity of the unheated coating film and the MEK-absorption capacity of the coating film not containing polycarbodiimide and zinc oxide is preferably 13 and more preferably 26. Meanwhile, the upper limit of the difference in the MEK-absorption capacity is preferably 45 and more preferably 40. When the difference in the MEK-absorption capacity is less than the lower limit, the formability of the glove main body may be inferior and the tearing strength of the glove may be insufficient. To the contrary, when the difference in the MEK-absorption capacity is greater than the upper limit, flexibility of the glove may be inferior.

The MEK-absorption capacity of the unheated coating film is influenced by the type, etc. of the nitrile-butadiene rubber which is the principal component of the latex material; however, the upper limit of the MEK-absorption capacity of the unheated coating film is preferably 60 times and more preferably 30 times. When the MEK-absorption capacity is greater than the upper limit, the formability of the glove main body may be inferior and the tearing strength of the glove may be insufficient. Meanwhile, the lower limit of the MEK-absorption capacity is not particularly limited, and is typically no less than 3 times in light of flexibility of the glove.

Drying

In the drying S3, the hand glove mold after the second immersion S2 is subjected to drying. Specifically, the moisture in the latex coating film formed by the immersing in the latex material is vaporized and then the crosslinking reaction is promoted to form the glove main body. The drying may be carried out by, for example, using a well-known oven. In addition, in the drying S3, a profile of drying temperature and drying time period is controlled in such a way that the MEK-absorption capacity of the glove main body is no greater than 25 times.

The vaporization of the moisture in the drying S3 is preferably carried out by holding the hand glove mold at room temperature (no lower than 20° C. and no higher than 40° C.) for a specific period of time. The present inventors have obtained a knowledge that holding the glove main body at room temperature enhances the effect of inhibiting the generation of cracks.

The time period for drying at room temperature is preferably no less than 10 hrs and no greater than 20 hrs. When the time period for drying at room temperature is less than the lower limit, the drying is likely to be uneven and therefore cracks may be more likely to be generated in the glove main body. To the contrary, when the time period for drying at room temperature is greater than the upper limit, the production efficiency may be inferior.

In addition, the vaporization of moisture in the drying S3 preferably includes, subsequently to the drying at room temperature, high-temperature drying. In the case of thus carrying out the high-temperature drying subsequently to the drying at room temperature, the time period for drying at room temperature may be no less than 20 sec and no greater than 200 sec.

The drying temperature for vaporizing the moisture in a high temperature environment is preferably no lower than 50° C. and no higher than 100° C. When the drying temperature is lower than the lower limit, the undried coating film may run, leading to unevenness of the glove main body. To the contrary, when the drying temperature is higher than the upper limit, the drying is likely to be uneven due to rapid drying, and consequently strong tension is likely to be applied partially to the coating film. As a result, the coating film is likely to contract, leading to generation of cracks in the glove main body. The drying time period for vaporizing the moisture after the raising of temperature is preferably no less than 10 min and no greater than 90 min, in light of the production efficiency.

By thus carrying out the high-temperature drying subsequently to the drying at room temperature, the vaporization of the moisture in a shorter period of time is enabled while the generation of cracks is inhibited.

The lower limit of the drying temperature upon the promotion of the crosslinking reaction is preferably 100° C. and more preferably 110° C. Meanwhile, the upper limit of the drying temperature is preferably 150° C. and more preferably 140° C. When the drying temperature is lower than the lower limit, the crosslinking reaction may not be sufficiently promoted. To the contrary, when the drying temperature is higher than the upper limit, the crosslinking reaction may be non-homogeneous, and the glove main body may deteriorate due to heat.

The lower limit of the drying time period upon the promotion of the crosslinking reaction is preferably 5 min and more preferably 10 min. Meanwhile, the upper limit of the drying time period is preferably 90 min and more preferably 60 min. When the drying time period is less than the lower limit, the crosslinking reaction may not be sufficiently promoted. To the contrary, when the drying time period is greater than the upper limit, the production efficiency may be inferior.

The percentage content of the MEK-insoluble matter in, and the MEK-absorption capacity of, the glove main body vary in accordance with the constitution of the latex material, as well as the drying temperature and the drying time period upon the promotion of the crosslinking reaction. Therefore, the drying temperature and the drying time period upon the promotion of the crosslinking reaction are determined in such a way that the percentage content of the MEK-insoluble matter in, and the MEK-absorption capacity of, the glove main body are as desired (for example, the MEK-absorption capacity being no greater than 25 times).

After the vaporization of the moisture and the promotion of the crosslinking reaction, the glove main body constituted with the latex coating film is removed from the hand glove mold, to provide the glove.

It is to be noted that the coagulation agent, the surfactant, etc., may bloom or bleed from the latex coating film. In such a case, the bloomed or bled material may be removed by: immersing in a water bath the glove on the hand glove mold after the vaporization of the moisture; laundering the glove removed from the hand glove mold; or the like. The removal of the coagulation agent, the surfactant, etc., may take place after the vaporization of the moisture in the drying S3, or after the crosslinking reaction.

Advantages

In the glove and the glove produced by the production method of the above embodiments, the glove main body contains: the polycarbodiimide in a mass ratio to the nitrile-butadiene rubber being no less than 0.003; and zinc oxide in a mass ratio to the nitrile-butadiene rubber being no less than 0.010. In addition, in the glove and the glove produced by the production method of the above embodiments, the crosslinking density between the nitrile-butadiene rubber and the polycarbodiimide is high due to the MEK-absorption capacity of the glove main body being no greater than 25 times, hereby enabling the generation of cracks in the glove main body to be inhibited and the tearing strength to be increased. Furthermore, the glove and the glove produced by the production method of the above embodiments are superior in flexibility when the mass ratio of the polycarbodiimide to the nitrile-butadiene rubber is no greater than 0.1, and inhibition of deterioration of the glove main body caused by excessive zinc oxide is enabled when the mass ratio of zinc oxide to the nitrile-butadiene rubber is no greater than 0.05. Therefore, the glove and the glove produced by the production method of the above embodiments are superior in appearance, flexibility and tearing strength, and provides superior durability, oil resistance, and chemical resistance due to less likelihood of formation of a cleavage in the glove main body.

Other Embodiments

The present invention is not limited to the above described embodiment, and can also be carried out in modes modified and improved in various ways.

In the second immersion of above embodiment, the immersion once in the latex material in which the polycarbodiimide and zinc oxide are blended into the nitrile-butadiene rubber latex has been explained; however, the immersions may be carried out multiple times. In such a case, a latex coating film having a multilayer structure may be formed by successively conducting the immersion in latex materials having constitutions different from one another. In the case of forming the coating film having a multilayer structure by using a plurality of latex materials, at least one of which is required to be the latex material in which the polycarbodiimide and zinc oxide are blended into the nitrile-butadiene rubber latex, while other latex material(s) may have arbitrary constitution(s).

A coating agent may be applied after the formation of the latex coating film. The application of the coating agent is carried out in the drying step. In addition, the external surface of the latex coating film coated with the coating agent on the hand glove mold may be presented as the inner face of the glove, by removing the glove main body from the hand glove mold in such a way that the latex coating film is inside out.

As the coating agent, a well-known coating agent may be used, examples of which include a lubricant, a flock lining, a hand moisturizer, etc. for facilitating wearing and removal of the glove. The coating agent may be applied either to an entire surface of the glove main body, or to a part of the surface of the glove main body such as fingertip regions and a palm region.

Furthermore, an antislipping effect and/or a visual effect may be imparted to the glove main body by providing irregularities on the latex coating film. A procedure of providing irregularities on the latex coating film is exemplified by a procedure of providing desired irregularities on the hand glove mold and transferring a pattern of the irregularities.

EXAMPLES

The present invention is described further in detail hereinafter by way of Examples, Reference Examples and Comparative Examples; however, the present invention is not limited to the following Examples.

Reference Example 1

A latex material constituted with as a principal component, a nitrile butadiene rubber (NBR) latex ("Nipol CLX550L" available from Zeon Corporation) containing a polycarbodiimide ("XR-5508" available from Stahl Japan Limited) and zinc oxide ("Zinc Oxide II" available from SEIDO CHEMICAL INDUSTRY CO., LTD.) was prepared such that a solid content was as specified in Table 1. It is to be noted that the latex material was diluted with ion exchanged water such that a percentage content of the NBR was 35% by mass.

Evaluation of Percentage Content of MEK-Insoluble Matter and MEK-Absorption Capacity In order to measure the percentage content of MEK-insoluble matter and the MEK-absorption capacity of the glove main body produced by using the aforementioned latex material, test pieces were provided and measurements were carried out according to the procedures described below.

The aforementioned latex material was diluted with ion exchanged water such that a solid content was 30% by mass. In a glass petri dish having an inner diameter of 10 cm, 5 g of the latex material thus diluted was placed and then dried in an oven at 30° C. for 15 hrs to remove the moisture, thereby providing two films having an average thickness of about 0.05 mm.

Measurements of Percentage Content of MEK-Insoluble Matter and MEK-Absorption Capacity in Unheated State One of the two films thus obtained was cut into test pieces of about 5-mm square, a plurality of test pieces were selected to have a total mass of about 0.2 g, and the total mass (W (g)) was measured to 4 significant digits. The plurality of test pieces were placed in a #80-mesh metal basket of which mass having been measured beforehand (bottom face: about 2-cm square, weight: about 9 g).

Subsequently, the basket containing the plurality of test pieces was immersed in 100 ml of methyl ethyl ketone (MEK) and left to stand for 24 hrs at a temperature no lower than 23° C. and no higher than 25° C. Thereafter, the basket was withdrawn from MEK and gently shaken for 30 sec to drain excessive MEK, and then a total mass of the basket containing the plurality of test pieces was measured. A mass (A (g)) of the plurality of test pieces impregnated with MEK was obtained by calculating a difference between the total mass of the basket containing the plurality of test pieces and the mass of the basket measured beforehand. Furthermore, the basket containing the plurality of test pieces was subjected to drying at 30° C. for 3 hr and then at 105° C. for 30 min, and thereafter a total mass of the basket containing the plurality of test pieces was measured. A mass (B (g)) of the plurality of test pieces after the drying was obtained by calculating a difference between the total mass of the basket containing the plurality of test pieces and the mass of the basket measured beforehand. On the basis of the masses thus calculated, the MEK-absorption capacity of, and the percentage content of MEK-insoluble matter in, the glove main body produced by using the aforementioned latex material were obtained according to the following equations. The results are shown in Table 1. The percentage content of a MEK-insoluble matter in, and the MEK-absorption capacity of, the glove main body produced by using the aforementioned latex material are equivalent to the percentage content of a MEK-insoluble matter in, and the MEK-absorption capacity of, the withdrawn coating film obtained after the second immersion in the production method of a glove.

$$\text{Methyl ethyl ketone-absorption capacity (times)} = A/B \tag{1}$$

$$\text{Percentage content of a methyl ethyl ketone-insoluble matter (\% by mass)} = B/W \times 100 \tag{2}$$

Measurements of Percentage Content of MEK-Insoluble Matter and MEK-Absorption Capacity after Heating The other one of the two films was dried by heating at 120° C. for 40 min to allow for progress of the crosslinking. Test pieces were cut out from the film thus dried by heating, and the percentage content of the MEK-insoluble matter and the MEK-absorption capacity were measured similarly to the measurements of the percentage content of the MEK-insoluble matter and the MEK-absorption capacity in the unheated state. The results are shown in Table 1. The percentage content of the MEK-insoluble matter and the MEK-absorption capacity thus measured are equivalent to the percentage content of the MEK-insoluble matter in, and the MEK-absorption capacity of, the glove main body of the glove.

Assessment of Cracks

In order to confirm that the inhibition of generation of cracks is enabled when the glove main body contains zinc oxide and the cross-linked product from the nitrile butadiene rubber and the polycarbodiimide, a latex coating film equivalent to the glove main body was formed on a surface of an unglazed pottery board by using the aforementioned latex material, and then assessment was carried out.

A pottery board of 10 cm in width, 15 cm in height, and 3 mm in thickness was provided. In a central portion of a surface of the pottery board, 81 recessed parts (9 columns×9 rows) were provided at intervals of 5 mm, each having a rectangular parallelpiped shape of 5 mm in width, 5 mm in height, and 0.4 mm in depth.

The pottery board was heated to 75° C., immersed in and withdrawn from a 17 mass % calcium nitrate-methanol solution prepared as a coagulation agent, and then dried at 75° C. for 3 min. The pottery board coated with the coagulation agent was immersed for 30 sec in and withdrawn from the aforementioned latex material, and then dried at room temperature (25° C.) for 60 sec, at 75° C. for 10 min, and at 120° C. for 10 min, thereby vaporizing the moisture in the latex coating film formed on the pottery board while promoting the crosslinking.

The latex coating film thus formed was removed from the pottery board, and presence of cracks in a region provided with irregularities was assessed according to the following criteria. The results are shown in Table 1.

Assessment Criteria for Cracks
A: No crack observed
B: Cracks observed in region provided with irregularities
C: Cracks observed in the entirety of coating film
Evaluations of Flexibility, Tearing Strength, Chemical Resistance and Solvent Resistance For the purpose of evaluations of flexibility, tearing strength, chemical resistance and solvent resistance of the glove, a latex coating film equivalent to the glove main body was formed on a surface of an unglazed pottery bar by using the aforementioned latex material, and then evaluations were carried out.

A pottery bar of 6 cm in diameter and 20 cm in height was provided. The pottery bar was heated to 75° C., immersed in and withdrawn from a 28 mass % calcium nitrate-methanol solution prepared as a coagulation agent, and then dried at 75° C. for 3 min. The pottery bar coated with the coagulation agent was immersed for 30 sec in and withdrawn from the aforementioned latex material, and then dried at room temperature (25° C.) for 60 sec, at 60° C. for 30 min, and at 120° C. for 30 min, thereby vaporizing the moisture in the latex coating film formed on the pottery bar while promoting the crosslinking.

The latex coating film thus formed was removed from the pottery bar, test pieces were cut out from a lateral face portion, and the following evaluations were carried out.

Flexibility

A test piece of 3 cm×10 cm thus cut out was stretched manually to evaluate the flexibility according to the following criteria. The results are shown in Table 1.

Evaluation Criteria for Flexibility
A: Flexibility required for glove being provided
B: Being slightly stiff, but usable as glove
C: Stretch being insufficient, and unusable as glove
Tearing Strength A test piece was provided by using a punching machine for unnotched angle-type test piece specified in JIS-K-6252-1: 2015. The test piece thus formed by punching was introduced into a tester ("AGS-J" available from Shimadzu Corporation) and stretched until rupture of the test piece under conditions involving a chuck interval of 60 mm and a strain rate of 500 mm/min. The measurement was carried out for 4 times and an arithmetic average of the maximum value of each measurement was obtained as the tearing strength (N). The results are shown in Table 1.

Chemical Resistance and Solvent Resistance

Two test pieces each having a square shape of 5 cm×5 cm in a planar view were cut out. For an evaluation of chemical resistance, one of the two test pieces was immersed in a 10 mass % sodium hydroxide aqueous solution at 23° C. for 6 hrs. For an evaluation of solvent resistance, the other one of the two test pieces was immersed in clear kerosene (JIS-K-2203 Grade 1 kerosene) at 23° C. for 1 hour. An area of each test piece in a planar view was measured before and after the immersion, and a proportion (%) of a post-immersion area with respect to a pre-immersion area was calculated as a swelling rate. A lower swelling rate indicates superior resistance. The results are shown in Table 1.

Reference Examples 2 to 6, Example 7 and Comparative Examples 1 to 6

Evaluations of Reference Examples 2 to 6, Example 7 and Comparative Examples 1 to 6 were conducted in a similar manner to Reference Example 1, except that latex materials were prepared such that solid contents were as specified in Table 1. In Example 7 and Comparative Example 6, sulfur ("Sulfur" available from Hosoi Chemical Industry. Co., Ltd.) and a vulcanization accelerating agent ("Sanceler BZ" available from Sanshin Chemical Industry Co., Ltd.) were added to the latex material such that solid contents were as specified in Table 1. The evaluation results are shown in Table 1.

Evaluation of Durability Against Folding

Evaluation of durability of Reference Example 6, Example 7 and Comparative Example 6 containing the vulcanizing agent and the vulcanization accelerating agent as additives was conducted.

Durability

A latex coating film was formed in a similar manner to Reference Example 1, and test pieces were formed from a lateral face portion by punching out using a dumbbell No. 3. The test pieces were each folded into two, and a 20-kg load was applied thereto in an oven at 60° C. After being left to stand for 4 days, the test pieces were cooled to room temperature of 23° C. and the maximum load (MPa) upon stretch at a strain rate of 100 mm/min was measured. The measurement was repeated 8 times and an average of the measured values was obtained. The evaluation results are shown in Table 1.

Examples 8 to 10 and Comparative Examples 7 and 8

Evaluations of Examples 8 to 10 and Comparative Examples 7 and 8 were conducted in a similar manner to Example 1, except that "CARBODILITE E-02" (carbodiimide equivalent: 445) available from Nisshinbo Chemical Inc. was used as the polycarbodiimide, and latex materials were prepared such that solid contents were as specified in Table 1. The evaluation results are shown in Table 1.

Example 11 and Comparative Example 9

Evaluations of Example 11 and Comparative Example 9 were conducted in a similar manner to Reference Example 1, except that "Nipol LX550" available from Nippon ZEON Co., Ltd. was used as the NBR latex, and latex materials were prepared such that solid contents were as specified in Table 1. In Example 11, sulfur and the vulcanization accelerating agent were added as in Example 7. The evaluation results are shown in Table 1.

TABLE 1

| | Product Name | Reference Example 1 | Reference Example 2 | Reference Example 3 | Reference Example 4 | Reference Example 5 | Reference Example 6 | Example 7 | Reference Example 8 | Reference Example 9 | Reference Example 10 |
|---|---|---|---|---|---|---|---|---|---|---|---|
| Solid content ratio (parts by mass) | NBR CLX550L | 100 | 100 | 100 | 100 | 100 | 100 | 100 | 100 | 100 | 100 |
| | LX550 | — | — | — | — | — | — | — | — | — | — |
| | Polycarbodiimide XR-5508 | 2 | 2 | 2 | 1 | 5 | 1 | 1 | 0.40 | 7.00 | 2.00 |
| | E-02 | — | — | — | — | — | — | — | — | — | — |
| | Zinc oxide | 2 | 1 | 3 | 2 | 2 | 2 | 1 | 2 | 2 | 2 |
| | Sulfur | — | — | — | — | — | — | 1.5 | — | — | — |
| | Vulcanization accelerating agent | — | — | — | — | — | — | 0.5 | — | — | — |
| | Molar ratio of polycarbodiimide to NBR | 0.020 | 0.020 | 0.020 | 0.010 | 0.050 | 0.010 | 0.010 | 0.004 | 0.070 | 0.020 |
| | Molar ratio of zin oxide to NBR | 0.020 | 0.010 | 0.030 | 0.020 | 0.020 | 0.010 | 0.010 | 0.020 | 0.020 | 0.020 |
| | Molar ratio of zinc oxide to carbodiimide group | — | — | — | — | — | — | — | 27 | 1.6 | 5.5 |
| Unheated | Content of MEK-insoluble matter (%) | 74.6 | 78.1 | 86.8 | 69.3 | 90.9 | 63.3 | 63.8 | 63.1 | 87.2 | 69.1 |
| | MEK-absorption capacity (times) | 13.6 | 14.8 | 11.3 | 18.6 | 7.8 | 24.3 | 26.4 | 24.8 | 10.5 | 17.7 |
| After heating | Content of MEK-insoluble matter (%) | 72.8 | 75.7 | 80.3 | 68.2 | 89.2 | 67.2 | 84.8 | 67.5 | 86.3 | 70.1 |
| | MEK-absorption capacity (times) | 14.3 | 15.7 | 12.8 | 18.3 | 8.9 | 22.8 | 9.0 | 22.1 | 10.2 | 16.8 |
| Evaluation | Cracks | A | A | A | A | A | A | A | A | A | A |
| | Flexibility | A | A | A | A | A | A | A | A | B | A |
| Swelling rate (%) | Tearing strength (N) | 26.1 | 22.7 | 26.6 | 25.6 | 36.5 | 21.0 | 22.3 | 24.2 | 41.0 | 27.6 |
| | 10% NaOH | 2.9 | 3.3 | 2.9 | 3.2 | 2.5 | 3.8 | 3.8 | 2.3 | 1.9 | 4.3 |
| | Clear kerosene | 11.4 | 11.7 | 11.3 | 11.4 | 10.5 | 11.7 | 11.0 | 10.4 | 7.5 | 10.3 |
| | Maximum load (MPa) | — | — | — | — | — | 28.0 | 35.1 | — | — | — |

| | Product Name | Example 11 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Solid content ratio (parts by mass) | NBR CLX550L | — | 100 | 100 | 100 | 100 | 100 | 100 | 100 | 100 | 100 |
| | LX550 | 100 | — | — | — | — | — | — | — | — | — |
| | Polycarbodiimide XR-5508 | 1 | — | 2 | — | 2 | 2 | 1 | 0.18 | 12.15 | — |
| | E-02 | — | 2 | — | 2 | — | 7 | — | — | — | — |
| | Zinc oxide | 1 | — | — | — | — | — | 1.5 | 2 | 2 | — |
| | Sulfur | 1.5 | — | — | — | 0.25 | — | — | — | — | — |
| | Vulcanization accelerating agent | 0.5 | — | — | — | — | — | 0.5 | — | — | — |
| | Molar ratio of polycarbodiimide to NBR | 0.010 | 0.000 | 0.020 | 0.000 | 0.020 | 0.020 | 0.000 | 0.002 | 0.122 | 0.000 |
| | Molar ratio of zin oxide to NBR | 0.010 | 0.020 | 0.000 | 0.000 | 0.003 | 0.070 | 0.010 | 0.020 | 0.020 | 0.000 |
| | Molar ratio of zinc oxide to carbodiimide group | — | — | — | — | — | — | — | 60 | 0.9 | 0.3 |
| Unheated | Content of MEK-insoluble matter (%) | 40.9 | 61.4 | 62.4 | 60.3 | 64.0 | 89.0 | 24.8 | 60.6 | 82.9 | 824.0 |
| | MEK-absorption capacity (times) | 50.0 | 61.7 | 25.4 | 45.0 | 24.0 | 10.0 | 79.0 | 39.4 | 9.5 | 824.0 |
| After heating | Content of MEK-insoluble matter (%) | 81.8 | 61.4 | 63.4 | 62.3 | 63.0 | 87.0 | 83.7 | 61.6 | 85.7 | 40.0 |
| | MEK-absorption capacity (times) | 10.4 | 30.2 | 25.1 | 27.3 | 24.0 | 11.0 | 9.4 | 32.0 | 9.8 | 52.0 |
| Evaluation | Cracks | A | C | B | C | B | A | C | C | A | C |
| | Flexibility | A | A | A | A | A | C | A | A | C | A |
| Swelling rate (%) | Tearing strength (N) | 27.5 | 24.0 | 11.1 | 10.3 | 13.4 | 25.3 | 21.3 | 23.4 | 40.8 | 10.1 |
| | 10% NaOH | 6.4 | 5.4 | 5.8 | 6.8 | 5.0 | 2.9 | 6.2 | 2.4 | 2.9 | 7.5 |
| | Clear kerosene | 12.2 | 12.5 | 12.8 | 12.8 | 12.4 | 11.30 | 11.7 | 10.9 | 7.5 | 15.4 |
| | Maximum load (MPa) | — | — | — | — | — | — | 31.3 | — | — | — |

In Table 1, in columns showing "Solid content ratio", "-" denotes the absence of the corresponding component. In columns showing "Molar ratio of zinc oxide to carbodiimide group", "-" denotes the absence of calculation of the molar ratio due to the carbodiimide equivalent of the polycarbodiimide used being unknown. In columns showing "Maximum load", "-" denotes the absence of measurement of the durability against folding.

From Table 1, comparisons among Examples, Reference Examples and Comparative Examples in which the same NBR product and the same polycarbodiimide product were used indicates that Reference Examples 1 to 6, Example 7, Reference Examples 8 to 10 and Example 11 exhibited reduced cracks and higher tearing strength than Comparative Examples 1 to 9. In this regard, in Comparative Examples 1 to 3 and 9, a large number of cracks was considered to be due to the MEK-absorption capacity after heating, i.e., the MEK-absorption capacity of the glove main body being too great. In Comparative Example 4, the tearing strength was low due to the mass ratio of zinc oxide to the nitrile-butadiene rubber being too small. To the contrary, Comparative Example 5 was considered to have insufficient flexibility due to the mass ratio of zinc oxide to the nitrile-butadiene rubber being too great, and thus was unusable as a glove. Comparative Examples 6 and 7 were considered to fail to produce the effect of inhibiting the generation of cracks due to the mass ratio of the polycarbodiimide to the nitrile-butadiene rubber being too small. To the contrary, Comparative Example 8 had insufficient flexibility due to the mass ratio of the polycarbodiimide to the nitrile-butadiene rubber being too great, and thus was unusable as a glove.

In addition, comparisons of Reference Examples 1 to 6 with Comparative Examples 1 to 3 that were different only in the presence of the polycarbodiimide and zinc oxide indicate that the swelling rates of Reference Examples 1 to 6 in the 10 mass % sodium hydroxide aqueous solution were lower than the swelling rates of Comparative Examples 1 to 3 in the 10 mass % sodium hydroxide aqueous solution. Reference Examples 1 to 6 contained both the polycarbodiimide and zinc oxide, whereas Comparative Examples 1 to 3 did not contain at least one of the polycarbodiimide and zinc oxide. It is therefore proven that a reduction in the swelling rate in the 10 mass % sodium hydroxide aqueous solution, i.e., an improvement of the chemical resistance, was enabled only when both the polycarbodiimide and zinc oxide were contained.

Furthermore, comparisons of Reference Examples 1 to 3 with Comparative Examples 2 and 4, which were different from Reference Examples 1 to 3 only in lower zinc oxide contents, indicate that the swelling rates of Reference Examples 1 to 3 in the clear kerosene were lower than the swelling rates of Comparative Examples 2 and 4 in the clear kerosene. Meanwhile, comparisons of Reference Examples 1, 4 and 5 with Comparative Example 1, which was different from Reference Examples 1, 4 and 5 only in a lower polycarbodiimide content, indicate that the swelling rates of Reference Examples 1, 4 and 5 in the clear kerosene were lower than the swelling rate of Comparative Example 1 in the clear kerosene. In addition, the swelling rates of Reference Examples 1 to 5 in the clear kerosene were lower than the swelling rate of Comparative Example 3, which contained neither the polycarbodiimide nor the zinc oxide, in the clear kerosene. It is therefore proven that an improvement of the solvent resistance in the clear kerosene was also enabled when both the polycarbodiimide and the zinc oxide were contained.

From the foregoing, it is concluded that a glove having a small number of cracks and high tearing strength can be obtained, due to the glove main body containing zinc oxide and the cross-linked product from the nitrile butadiene rubber and the polycarbodiimide, in which the mass ratio of the polycarbodiimide to the nitrile-butadiene rubber is no less than 0.003 and no greater than 0.1, the mass ratio of zinc oxide to the nitrile-butadiene rubber is no less than 0.010 and no greater than 0.05, and the MEK-absorption capacity of the glove main body is no greater than 25 times.

Moreover, a comparison of Example 7 with Reference Example 6 that were different only in the presence of sulfur and the vulcanization accelerating agent indicates that the value of the maximum load of Reference Example 6 was smaller than that of Example 7 by about 20% in the evaluation of the durability against folding. Example 7 contained sulfur and the vulcanization accelerating agent, whereas Reference Example 6 did not contain sulfur and the vulcanization accelerating agent. It is therefore proven that using sulfur and the vulcanization accelerating agent in addition to the polycarbodiimide and zinc oxide enabled a dramatic improvement in durability. It is to be noted that, in regard to Comparative Example 6, the value of the maximum load was greater than that of Reference Example 6, but the films adhered to each other and some films were ruptured. Comparative Example 6 contained sulfur and the vulcanization accelerating agent, but did not contain the polycarbodiimide.

More specifically, comparisons among Reference Examples 8 to 10, which contained the same type of nitrile-butadiene rubber, the polycarbodiimide, and zinc oxide in the latex material, indicates that Reference Example 9, in which the mass ratio of the polycarbodiimide to the nitrile-butadiene rubber was greater than 0.06, exhibited lower flexibility. It is therefore concluded that the mass ratio of the polycarbodiimide to the nitrile-butadiene rubber is more preferably no greater than 0.06.

INDUSTRIAL APPLICABILITY

As explained in the foregoing, in regard to the glove according to the present invention and the glove produced by the production method according to the present invention, the glove main body containing nitrile butadiene rubber as a principal component has only a small number of cracks and high tearing strength. Therefore, the glove according to the present invention is superior in appearance, and provides superior durability, oil resistance, and chemical resistance due to less likelihood of formation of a cleavage in the glove main body.

What is claimed is:

1. A glove comprising a glove main body for covering a wearer's hand, the glove main body comprising nitrile-butadiene rubber as a principal component, wherein:
   the glove main body comprises zinc oxide, a vulcanizing agent, a vulcanization accelerating agent, and a cross-linked product from the nitrile-butadiene rubber and polycarbodiimide;
   a mass ratio of the polycarbodiimide to the nitrile-butadiene rubber is no less than 0.003 and no greater than 0.1;
   a mass ratio of the zinc oxide to the nitrile-butadiene rubber is no less than 0.010 and no greater than 0.05; and a methyl ethyl ketone-absorption capacity of the glove main body is no greater than 25 times the glove main body on a mass basis, thereby inhibiting generation of cracks;

a percentage content of a methyl ethyl ketone-insoluble matter in the glove main body is no less than 65% by mass;

the nitrile-butadiene rubber comprises a carboxyl group; and a molar ratio of the zinc oxide to the carboxyl group is no less than 0.1 and no greater than 1.

2. The glove according to claim 1, wherein a molar ratio of the zinc oxide to carbodiimide group in the polycarbodiimide is no less than 1 and no greater than 50.

3. A production method of a glove comprising a glove main body for covering a wearer's hand, the glove main body comprising nitrile-butadiene rubber as a principal component, the method comprising immersing in a coagulation agent solution a hand glove mold, immersing in a latex material the hand glove mold after the immersing in the coagulation agent solution, and subjecting the hand glove mold to drying after the immersing in the latex material, wherein:

the latex material comprises a nitrile-butadiene rubber latex, polycarbodiimide, zinc oxide, a vulcanizing agent, and a vulcanization accelerating agent;

the nitrile-butadiene rubber comprises a carboxyl group;

contents of the polycarbodiimide and the zinc oxide in the latex material are adjusted in such a way that, in the glove main body, a mass ratio of the polycarbodiimide to the nitrile-butadiene rubber is no less than 0.003 and no greater than 0.1, a mass ratio of the zinc oxide to the nitrile-butadiene rubber is no less than 0.010 and no greater than 0.05, and a molar ratio of the zinc oxide to the carboxyl group is no less than 0.1 and no greater than 1; and in the drying, a profile of drying temperature and drying time period is controlled in such a way that a methyl ethyl ketone-absorption capacity of the glove main body is no greater than 25 times the glove main body on a mass basis, thereby inhibiting generation of cracks, and a percentage content of a methyl ethyl ketone-insoluble matter in the glove main body is no less than 65% by mass.

4. The method according to claim 3, wherein the profile comprises drying conditions comprising the drying temperature of no lower than 100° C. and no higher than 150° C. and the drying time period of no less than 10 min and no greater than 90 min.

* * * * *